United States Patent
Hagari

(10) Patent No.: US 7,441,544 B2
(45) Date of Patent: Oct. 28, 2008

(54) CONTROL DEVICE FOR INTERNAL COMBUSTION ENGINE

(75) Inventor: Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/806,114

(22) Filed: May 30, 2007

(65) Prior Publication Data

US 2008/0127938 A1   Jun. 5, 2008

(30) Foreign Application Priority Data

Dec. 4, 2006   (JP) .............................. 2006-327330

(51) Int. Cl.
*F02M 1/00* (2006.01)
*F02M 7/00* (2006.01)

(52) U.S. Cl. ...................... 123/434; 123/436

(58) Field of Classification Search ................. 123/434, 123/435, 436, 673
See application file for complete search history.

(56) References Cited

U.S. PATENT DOCUMENTS

| | | | |
|---|---|---|---|
| 5,349,932 A * | 9/1994 | Boverie et al. | 123/399 |
| 6,148,616 A * | 11/2000 | Yoshida et al. | 60/605.2 |
| 6,758,201 B2 * | 7/2004 | Hosoi | 123/679 |
| 7,100,547 B2 * | 9/2006 | Osamura et al. | 123/48 B |
| 7,107,978 B2 * | 9/2006 | Itoyama | 123/683 |
| 7,162,860 B2 * | 1/2007 | Shirakawa et al. | 60/277 |
| 2003/0070666 A1 * | 4/2003 | Hosoi | 123/672 |
| 2004/0112310 A1 * | 6/2004 | Osamura et al. | 123/48 B |
| 2004/0206070 A1 * | 10/2004 | Shirakawa | 60/285 |
| 2004/0250609 A1 * | 12/2004 | Shirakawa et al. | 73/118.1 |

FOREIGN PATENT DOCUMENTS

| | | |
|---|---|---|
| JP | 5-38143 B2 | 6/1993 |
| JP | 2005-54657 A | 3/2005 |
| JP | 2006-70701 A | 3/2006 |

* cited by examiner

*Primary Examiner*—John T Kwon
(74) *Attorney, Agent, or Firm*—Sughrue Mion, PLLC

(57) ABSTRACT

Provided is a control device for an internal combustion engine, which is provided to allow a throttle opening degree to be controlled in accordance with a target engine intake air flow quantity even during transitional operation. The actual cylinder intake air flow quantity calculating unit (21) calculates a response delay model for an intake system from a volumetric efficiency equivalent value (Kv) calculated from a rotational speed (Ne) of an engine (1) and an intake manifold pressure (Pim), an intake pipe volume (Vs), and a displacement (Vc) of each of cylinders (2), and calculates an actual cylinder intake air amount (Qcr) from an actual engine intake air amount (Qar) obtained from an air flow sensor (4) and the response delay model. The intake air flow quantity controlling unit (24) controls the throttle opening degree (TP) in accordance with the target engine intake air amount (Qat).

8 Claims, 7 Drawing Sheets

CONTROL DEVICE FOR INTERNAL COMBUSTION ENGINE

BACKGROUND OF THE INVENTION

1. Field of the Invention

The present invention relates to a control device for an internal combustion engine which has a function of calculating a target engine intake air flow quantity in the vicinity of a throttle valve such that a target cylinder intake air flow quantity is obtained with good responsiveness so as to control a throttle opening degree based on the target engine intake air flow quantity.

2. Description of the Related Art

In recent years, there has been proposed a control device for an internal combustion engine which uses a physical quantity acting directly on the control of a vehicle, namely, an output shaft torque of the internal combustion engine (engine) as a required value of a driving force from a driver or the vehicle side, and determines engine control amounts, namely, an air amount, a fuel amount, and an ignition timing with the output shaft torque adopted as an engine output target value so as to obtain good running performance.

It is generally known that an air amount has the greatest influence on an output shaft torque of an engine among engine control amounts. Therefore, there has also been proposed a control device for an internal combustion engine which controls an air amount with high accuracy.

In general, an intake system of an internal combustion engine is physically modeled as a first-order lag system (first-order lag filter). During steady operation, an intake air amount of the internal combustion engine (actual engine intake air flow quantity) and an amount of air sucked by cylinders of the internal combustion engine (actual cylinder intake air flow quantity) are considered to substantially coincide with each other. During transitional operation, however, the intake air amount of the internal combustion engine and the amount of air sucked by cylinders of the internal combustion engine do not coincide with each other (e.g., see JP 05-38143 A).

A conventional fuel control device for an internal combustion engine disclosed in JP 05-38143 A is equipped with an AN detection unit for detecting an intake air amount of the internal combustion engine by means of an intake air amount sensor disposed upstream of a throttle valve so as to detect an output as a result of this detection within an interval of a predetermined crank angle, an AN calculation unit for calculating an amount of air sucked by the internal combustion engine, and a control unit for controlling an amount of fuel supplied to the internal combustion engine based on the air amount calculated by the AN calculation unit. The AN calculation unit calculates the amount of air sucked by the internal combustion engine, using an amount of air sucked by the internal combustion engine during a preceding stroke and a first-order lag filter.

However, the conventional device disclosed in JP 05-38143 A does not take into account a volumetric efficiency equivalent value of air sucked into cylinders from an intake pipe, which includes the influences of intake valves and exhaust valves of the engine.

Therefore, in an engine having, for example, a mechanism for variably controlling intake valves and exhaust valves, there is a problem in that a great error occurs between a flow quantity of intake air actually sucked into the cylinders and an air amount calculated by the AN calculation unit in a certain operation range during transitional operation.

In order to solve the above-mentioned problem, another conventional control device for an engine is equipped with a fresh air amount detecting unit for outputting a detected value of an amount of fresh air passing through an intake passage (actual engine intake air flow quantity), an efficiency calculating unit for calculating a volumetric efficiency equivalent value, and a fresh air amount estimating unit for estimating a predicted value of an amount of fresh air flowing into combustion chambers (actual cylinder intake air flow quantity). The fresh air amount estimating unit estimates the predicted value of the amount of fresh air based on the detected value of the amount of fresh air and a change in the volumetric efficiency equivalent value (e.g., see JP 2005-54657 A).

However, the conventional device disclosed in JP 2005-54657 A does not take into account a method of controlling response characteristics during transitional operation.

Therefore, a long response delay of air for a change in throttle opening degree is observed in, for example, a low-load range. Thus, there is a problem in that the rotational speed of the engine temporarily drops due to an increased discrepancy between a target engine intake air flow quantity corresponding to a target torque of the engine and the detected value of the amount of fresh air passing through the intake passage (actual engine intake air flow quantity).

In order to solve the above-mentioned problem, another conventional control device for an internal combustion engine calculates an amount of air sucked into cylinders of the engine (actual cylinder intake air flow quantity) and a target throttle opening degree, respectively, using a normative model realizable in an entire range for a target intake air amount obtained from a target torque through conversion (target engine intake air flow quantity) and an inverse model of a response model of an intake air amount for a change in target throttle opening degree, thereby performing control to ensure substantially constant responsiveness of an actually measured torque or an estimated torque for the target torque.

This control device also corrects the target throttle opening degree in a feedback manner such that a difference between an output of the normative model and an amount of air actually sucked by the engine decreases, thereby causing the output of the normative model and the amount of air actually sucked by the engine to coincide with each other (e.g., see JP 2006-70701 A).

The conventional control device for the internal combustion engine disclosed in JP 2006-70701 A entails complicated arithmetic expressions and hence a large number of constants to be matched. Therefore, there is a problem in that an increase in the number of man-hours for matching, an increase in the number of man-hours for check and assessment, and an extension of calculation time are caused.

SUMMARY OF THE INVENTION

The present invention has been made to solve the above-mentioned problems, and it is therefore an object of the present invention to provide a control device for an internal combustion engine capable of calculating with high accuracy a target engine intake air flow quantity in the vicinity of a throttle valve with a reduced number of man-hours and in a shorter calculation time such that an actual cylinder intake air flow quantity swiftly converges at a target cylinder intake air flow quantity even during transitional operation, and controlling a throttle opening degree in accordance with the target engine intake air flow quantity.

According to the present invention, there is provided a control device for an internal combustion engine, including: a throttle valve provided in an intake pipe of the internal combustion engine; intake air flow quantity controlling means for controlling a throttle opening degree of the throttle valve to change an opening area of the intake pipe and hence variably controlling an actual engine intake air flow quantity, namely, a flow quantity of air actually sucked by the internal combustion engine; operation state detecting means for detecting operation states including at least a rotational speed of the internal combustion engine; intake air flow quantity detecting means provided upstream of the throttle valve in the intake pipe, for detecting the actual engine intake air flow quantity, namely, the flow quantity of air actually sucked by the internal combustion engine; intake pipe internal pressure detecting means for detecting a pressure downstream of the throttle valve in the intake pipe as an intake pipe internal pressure; actual cylinder intake air flow quantity calculating means for calculating an actual cylinder intake air flow quantity, namely, a flow quantity of air actually sucked into cylinders of the internal combustion engine; target cylinder intake air flow quantity calculating means for calculating a target cylinder intake air flow quantity based on the operation states; and target engine intake air flow quantity calculating means for making a correction equivalent to phase lead compensation for the target cylinder intake air flow quantity to calculate a target engine intake air flow quantity, in which: the actual cylinder intake air flow quantity calculating means calculates: a volumetric efficiency equivalent value of air sucked into the cylinders from the intake pipe based on the rotational speed and the intake pipe internal pressure; a response delay model for an intake system based on the volumetric efficiency equivalent value, an intake pipe volume from a downstream side of the throttle valve to inlets of the cylinders, and a displacement of each of the cylinders; and the actual cylinder intake air flow quantity based on the actual engine intake air flow quantity and the response delay model; and the intake air flow quantity controlling means controls the throttle opening degree based on the target engine intake air flow quantity such that the actual cylinder intake air flow quantity converges at the target cylinder intake air flow quantity.

In the control device for the internal combustion engine according to the present invention, the actual cylinder intake air flow quantity calculating unit calculates an actual cylinder intake air flow quantity based on an actual engine intake air flow quantity detected by the intake air flow quantity detecting unit and the response delay model for the intake system.

It is therefore possible to calculate the actual cylinder intake air flow quantity with high accuracy, using simple operational expressions derived from a physical model for the intake system.

The target engine intake air flow quantity calculating unit makes a correction equivalent to phase lead compensation for a target cylinder intake air flow quantity calculated from an operation state of the internal combustion engine, thereby calculating a target engine intake air flow quantity.

It is therefore possible to calculate with high accuracy the target engine intake air flow quantity in the vicinity of the throttle valve with a reduced number of man-hours and in a shorter calculation time such that the actual cylinder intake air flow quantity swiftly converges at the target cylinder intake air flow quantity even during transitional operation, using the simple operational expressions derived from the physical model for the intake system, and to control the throttle opening degree in accordance with the target engine intake air flow quantity.

DETAILED DESCRIPTION OF THE PREFERRED EMBODIMENTS

The respective embodiments of the present invention will be described hereinafter based on the drawings. In the following description, like reference symbols are used to denote like members or portions or corresponding members or portions in the respective drawings.

First Embodiment

Figure 1:
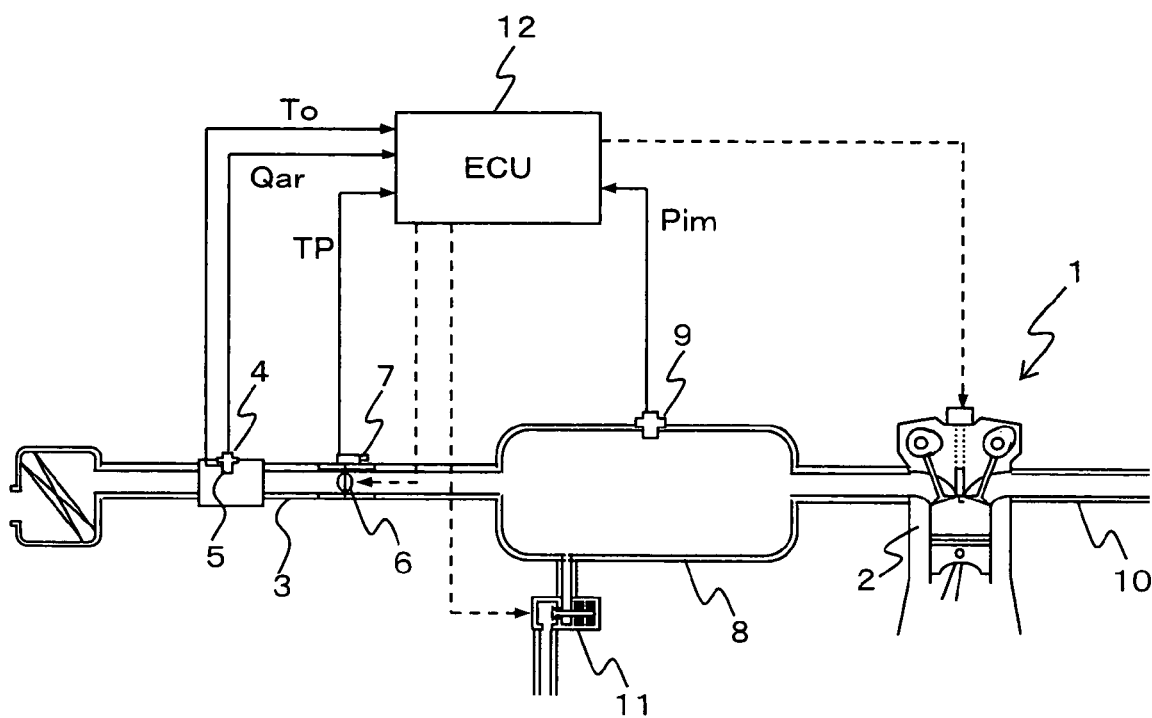
FIG. 1 is a schematic diagram roughly showing a control device for an internal combustion engine according to a first embodiment of the present invention.
Figure 2:
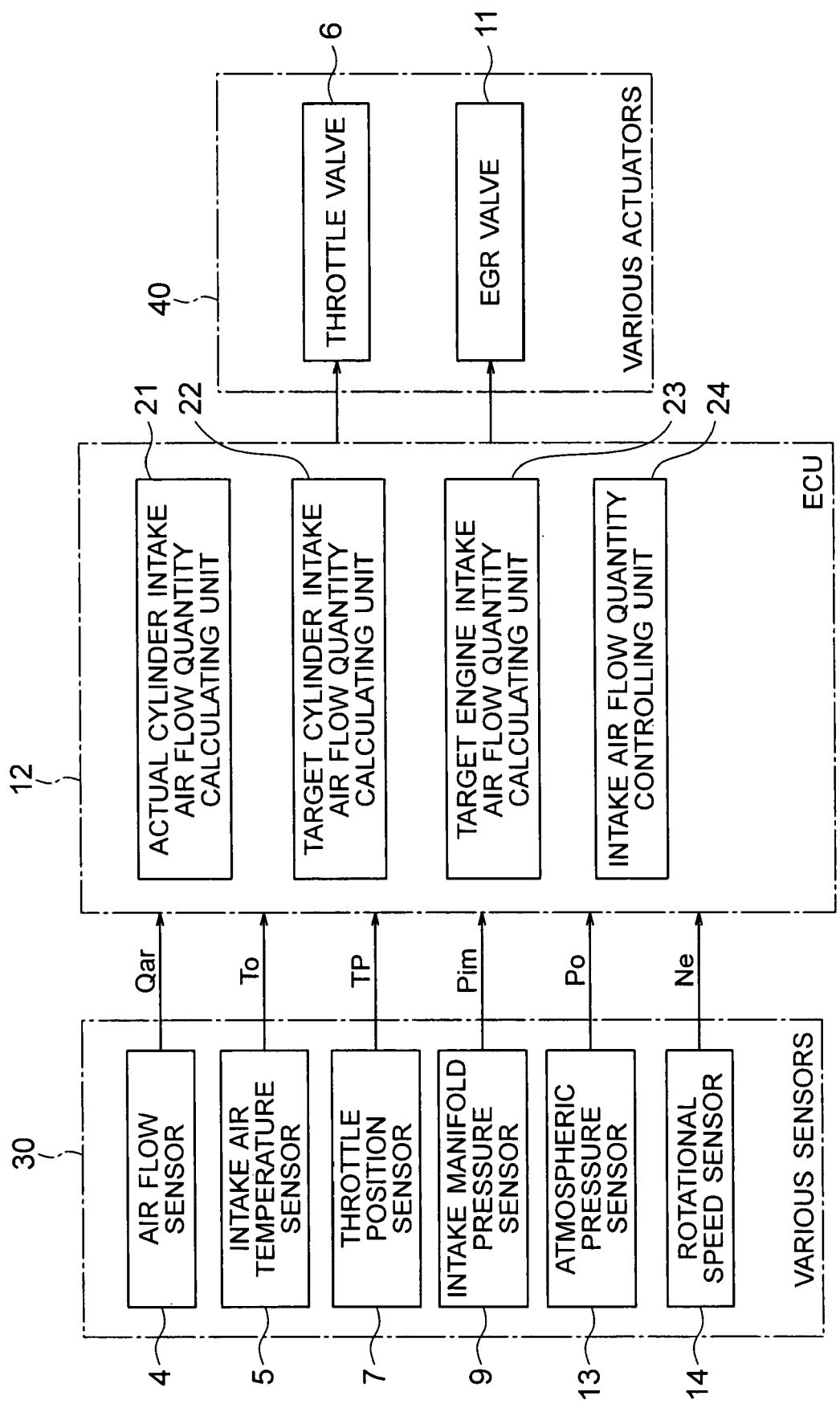
FIG. 2 is a block diagram roughly showing a construction of an engine control portion of the control device for the internal combustion engine according to the first embodiment of the present invention.

FIG. 1 is a schematic diagram roughly showing a control device for an internal combustion engine according to the first embodiment of the present invention. FIG. 2 is a block diagram roughly showing a construction of an engine control portion of the control device for the internal combustion engine according to the first embodiment of the present invention.

Although the internal combustion engine is generally provided with a plurality of cylinders 2, one of the cylinders 2 will be described in the following embodiments of the present invention.

Referring to FIG. 1, provided upstream of an intake pipe 3 constituting an intake system of an engine 1 (internal combustion engine) are an air flow sensor 4 (intake air flow quantity detecting unit) for measuring a flow quantity Qar of air actually sucked by the engine 1 (hereinafter abbreviated as "the actual engine intake air amount Qar") and an intake air temperature sensor 5 for measuring a temperature To of intake air (hereinafter abbreviated as "the intake air temperature To").

It is optional whether the intake air temperature sensor 5 is constructed integrally with the air flow sensor 4 or separately from the air flow sensor 4. Further, a unit for estimating the intake air temperature To from information obtained from another sensor may be employed instead of the intake air temperature sensor 5 for directly measuring the intake air temperature To.

In the intake pipe 3, a throttle valve 6 designed to be electronically controlled in an opening/closing manner to adjust the actual engine intake air amount Qar is provided on the engine 1 side downstream of the air flow sensor 4.

The throttle valve 6 is provided with a throttle position sensor 7 (operation state detecting unit) for measuring a throttle opening degree TP (operation state).

A surge tank 8 for homogenizing a pressure within the intake pipe 3 and an intake manifold pressure sensor 9 (intake pipe internal pressure detecting unit) for measuring a pressure within the surge tank 8 as an intake manifold pressure Pim (intake pipe internal pressure) are provided on the engine 1 side downstream of the throttle valve 6.

In addition, an EGR valve 11 for opening/closing an EGR pipe communicating with an exhaust pipe 10 of the engine 1 is connected to the surge tank 8.

A unit for estimating the intake manifold pressure Pim from information obtained from another sensor may be employed instead of the intake manifold pressure sensor 9 for directly measuring the intake manifold pressure Pim.

The actual engine intake air amount Qar from the air flow sensor 4, the intake air temperature To from the intake air temperature sensor 5 (temperature of throttle valve 6 on atmosphere side), the throttle opening degree TP from the throttle position sensor 7, and the intake manifold pressure Pim from the intake manifold pressure sensor 9 as well as measurement signals from other sensors (not shown) are input to an electronic control unit 12 (hereinafter referred to as "the ECU 12").

In accordance with a calculation result based on the measurement signals from the aforementioned respective sensors, the ECU 12 controls the throttle opening degree TP of the throttle valve 6 to adjust the actual engine intake air amount Qar, performs drive control of a fuel injection device (not shown) and an ignition device (not shown) of the engine 1 at required timings, respectively, and performs open/close control of the EGR valve 11 to improve a combustion state of the engine 1.

Referring to FIG. 2, various sensors 30 are connected to the ECU 12. The sensors 30 include an atmospheric pressure sensor 13 for measuring a pressure applied to the throttle valve 6 on the atmosphere side as an atmospheric pressure Po, a rotational speed sensor 14 (operation state detecting unit) provided on a crankshaft (not shown) of the engine 1 to measure a rotational speed Ne of the engine 1, and the like as well as a group of the aforementioned sensors 4, 5, 7, and 9.

A unit for estimating the atmospheric pressure Po from information obtained from another sensor may be employed instead of the atmospheric pressure sensor 13 for directly measuring the atmospheric pressure Po.

The ECU 12 includes an actual cylinder intake air flow quantity calculating unit 21, a target cylinder intake air flow quantity calculating unit 22, a target engine intake air flow quantity calculating unit 23, and an intake air flow quantity controlling unit 24.

The ECU 12 is constituted by a microprocessor (not shown) having a CPU and a memory in which programs are stored. Respective blocks constituting the ECU 12 are stored in the memory as pieces of software.

The actual cylinder intake air flow quantity calculating unit 21 calculates a flow quantity Qcr of air actually sucked into the cylinders 2 of the engine 1 (hereinafter abbreviated as "the actual cylinder intake air amount Qcr").

For this purpose, the actual cylinder intake air flow quantity calculating unit 21 first calculates a volumetric efficiency equivalent value Kv of air sucked into the cylinders 2 from the intake pipe 3 (hereinafter referred to as "the volumetric efficiency correction coefficient Kv") based on the rotational speed Ne of the engine 1 and the intake manifold pressure Pim.

Then, the actual cylinder intake air flow quantity calculating unit 21 calculates a response delay model for the intake system based on the volumetric efficiency correction coefficient Kv, an intake pipe volume Vs from the downstream side of the throttle valve 6 to inlets of the cylinders 2, and a displacement Vc of each of the cylinders 2.

Subsequently, the actual cylinder intake air flow quantity calculating unit 21 calculates the actual cylinder intake air amount Qcr based on the actual engine intake air amount Qar obtained from the air flow sensor 4 and the response delay model for the intake system.

The target cylinder intake air flow quantity calculating unit 22 calculates a target torque of the engine 1 based on operation states such as the rotational speed Ne of the engine 1 and an acceleration opening degree input from an accelerator opening degree sensor (not shown), and then calculates a target cylinder intake air flow quantity Qct for achieving the target torque (hereinafter abbreviated as "the target cylinder intake air amount Qct").

The target engine intake air flow quantity calculating unit 23 makes a correction equivalent to phase lead compensation for the target cylinder intake air amount Qct to calculate a target engine intake air flow quantity Qat (hereinafter abbreviated as "the target engine intake air amount Qat").

The intake air flow quantity controlling unit 24 calculates a target effective opening area of the throttle valve 6 based on the target engine intake air flow quantity Qat, and controls the throttle opening degree TP such that the actual cylinder intake air amount Qcr converges at the target cylinder intake air amount Qct, thereby adjusting the actual engine intake air amount Qar.

Control signals based on a calculation result in the ECU 12 are respectively output to various actuators 40 connected to the ECU 12. The actuators 40 include the throttle valve 6, the EGR valve 11, an injector (not shown) of the fuel injection device provided in each of combustion chambers of the engine 1, an ignition coil (not shown) of the ignition device, and the like.

Next, referring again to the schematic diagram of FIG. 1, the response delay model for the intake system allowing the actual cylinder intake air flow quantity calculating unit 21 to calculate the actual cylinder intake air amount Qcr from the actual engine intake air amount Qar measured by the air flow sensor 4 will be described in detail.

In the first embodiment of the present invention, it is assumed for the sake of simplification that a response delay of the throttle valve 6, a response delay of genuine air, a response delay of the air flow sensor 4, and the like are negligible.

First of all, when the law of conservation of mass is applied to fresh air in a range indicated by the intake pipe volume Vs [$cm^3$] from the downstream side of the throttle valve 6 to the inlets of the cylinders 2, the following equation (1) is established.

It should be noted in the equation (1) that n denotes an arbitrary stroke number, that Qar(n) [g/s] denotes an average value per stroke of the actual engine intake air amount Qar measured by the air flow sensor 4, that Qcr(n) [g/s] denotes an average value per stroke of the actual cylinder intake air amount Qcr, that T(n) [s] denotes a time per stroke (e.g., 180 degCA (crank angle) in the case of four-cylinder engine), and that ρa(n) [g/cm$^3$] denotes an average value per stroke of the density of fresh air within the intake pipe 3.

$$Qar(n)T(n)-Qcr(n)T(n)=\{\rho a(n)-\rho a(n-1)\}\cdot Vs \quad (1)$$

Given that Kv(n) denotes a volumetric efficiency correction coefficient of air sucked into the cylinders 2 from the intake pipe 3 in the stroke n, an actual cylinder intake air amount Qcr(n)T(n) [g] per stroke is expressed by the following equation (2), using the displacement Vc [cm$^3$] of each of the cylinders 2.

$$Qcr(n)T(n)=Kv(n)\cdot\rho a(n)\cdot Vc \quad (2)$$

Then, the following equation (3) is obtained by eliminating the density ρa(n) of fresh air per stroke through substitution of a solution for ρa(n) (i.e., Qcr(n)T(n)/Kv(n)·Vc) in the equation (2) for ρa(n) in the equation (1) to find a solution for the actual cylinder intake air amount Qcr(n)T(n) per stroke.

It should be noted in the equation (3) that Kf denotes a filter constant.

$$Qcr(n)T(n) = \quad (3)$$
$$\frac{Kv(n)}{Kv(n-1)}\cdot Kf\cdot Qcr(n-1)T(n-1)+(1-Kf)\cdot Qar(n)T(n)$$
$$\therefore Kf = \frac{Vs}{Vs+Kv(n)\cdot Vc}$$

The following equation (4) is obtained through further transformation of the equation (3).

$$\frac{Qcr(n)T(n)}{Kv(n)} = Kf\cdot\frac{Qcr(n-1)T(n-1)}{Kv(n-1)}+(1-Kf)\cdot\frac{Qar(n)T(n)}{Kv(n)} \quad (4)$$

It is apparent herein that the equation (4) represents an arithmetic expression of a digital low-pass filter in an interrupt handling performed in synchronization with rotation of the engine 1, for example, at intervals of a predetermined crank angle of the crankshaft. In other words, it is apparent that the intake system of the engine 1 is a first-order lag element.

Figure 3:
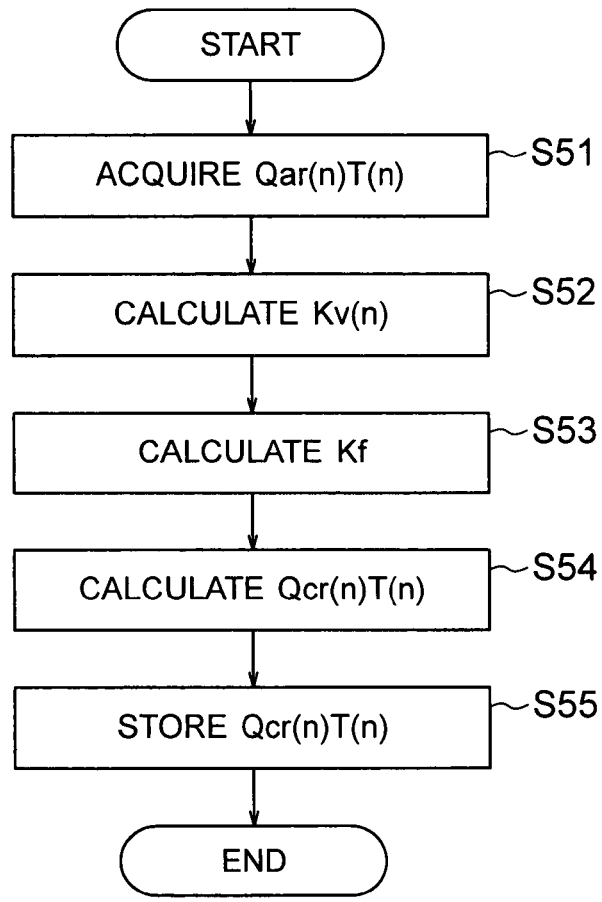
FIG. 3 is a flowchart showing the operation of an actual cylinder intake air flow quantity calculating unit according to the first embodiment of the present invention.

Subsequently, the operation of the actual cylinder intake air flow quantity calculating unit 21 according to the first embodiment of the present invention will be described with reference to a flowchart of FIG. 3 as well as FIGS. 1 and 2.

The operation shown in this flowchart is performed as an interrupt handling at intervals of a predetermined crank angle of the crankshaft.

First of all, the actual engine intake air amount Qar(n)T(n) [g] per stroke, which is measured by the air flow sensor 4, is acquired and stored into the memory (Step S51).

In a case where the air flow sensor 4 is a mass flow meter, an output voltage of the air flow sensor 4 is integrated while being sampled at intervals of, for example, 1.25 milliseconds. Based on an integrated value from an interrupt handling in a preceding stroke (stroke n-1) to a current interrupt handling, the actual engine intake air amount Qar(n)T(n) per stroke can be calculated.

In a case where the air flow meter 4 is a volume flow meter, the actual engine intake air amount Qar(n)T(n) per stroke can be calculated through conversion of a volume into a mass based on a standard atmospheric density, the atmospheric pressure Po measured by the atmospheric pressure sensor 13, and the intake air temperature To measured by the intake air temperature sensor 5.

Then, a volumetric efficiency correction coefficient Kv(n) in the stroke n is calculated based on the rotational speed Ne of the engine 1 and the intake manifold pressure Pim and stored into the memory (Step S52).

It should be noted herein that a relationship between the rotational speed Ne and the intake manifold pressure Pim on the one hand and the volumetric efficiency correction coefficient Kv on the other is measured in the engine 1 in advance and stored in the memory as a map.

The actual cylinder intake air flow quantity calculating unit 21 can calculate the volumetric efficiency correction coefficient Kv(n) in the stroke n through mapping at a timing of the interrupt handling with the use of the rotational speed Ne and the intake manifold pressure Pim in a current stroke (stroke n).

Subsequently, the filter constant Kf is calculated according to a calculation formula in the aforementioned equation (3) (Step S53).

Then, the actual cylinder intake air amount Qcr(n)T(n) per stroke is calculated according to the filter calculation formula in the aforementioned equation (3) (response delay model for intake system) (Step S54) and stored into the memory (Step S55).

In calculating the actual cylinder intake air amount Qcr(n)T(n) per stroke in Step S54, a volumetric efficiency correction coefficient Kv(n-1) and an actual cylinder intake air amount Qcr(n-1)T(n-1) per stroke, which were stored into the memory in the interrupt handling in the preceding stroke (stroke n-1), are used in addition to the respective values obtained in Steps S51 to S53.

As described above, the actual cylinder intake air flow quantity calculating unit 21 calculates the actual cylinder intake air amount Qcr(n)T(n) per stroke based on the actual engine intake air amount Qar(n)T(n) per stroke and the response delay model for the intake system expressed by the filter calculation formula in the aforementioned equation (3).

It is therefore possible to calculate with high accuracy the actual amount Qcr(n)T(n) of intake air sucked into the cylinders 2 of the engine 1 per stroke from the actual engine intake air amount Qar(n)T(n) per stroke in the vicinity of the throttle valve 6, using the simple arithmetic expression derived from the physical model for the intake system.

Then, it will be described in detail with reference to FIGS. 4 to 8 as well as FIGS. 1 to 3 how the target engine intake air flow quantity calculating unit 23 performs a processing of making a correction equivalent to phase lead compensation for the target cylinder intake air amount Qct calculated by the target cylinder intake air flow quantity calculating unit 22 to calculate the target engine intake air amount Qat.

First of all, a description will be given as to a case where the target cylinder intake air amount Qct is directly used as the target engine intake air amount Qat in the vicinity of the throttle valve 6 without making any correction by means of the target engine intake air flow quantity calculating unit 23.

Figure 4:
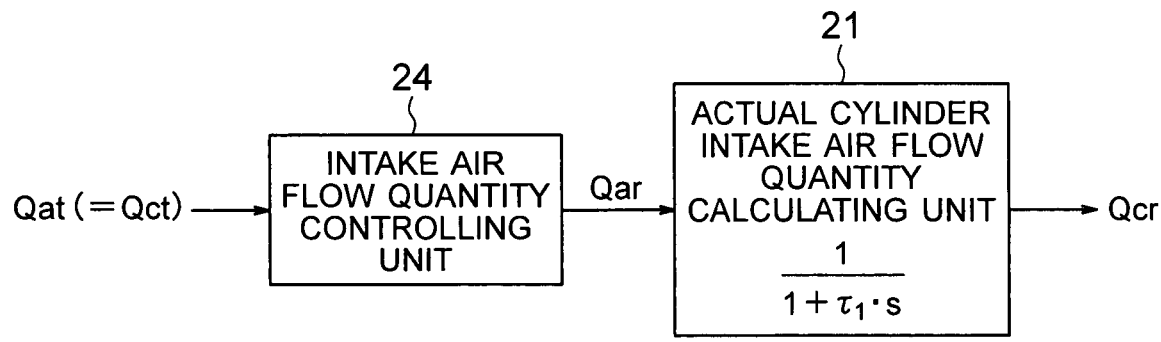
FIG. 4 is a block diagram showing an intake air processing portion from a target engine intake air amount to an actual cylinder intake air amount in a case where a target cylinder intake air amount is adopted as the target engine intake air amount.

FIG. 4 is a block diagram showing an intake air processing portion from the target engine intake air amount Qat to the actual cylinder intake air amount Qcr in a case where the target cylinder intake air amount Qct is adopted as the target engine intake air amount Qat.

Referring to FIG. 4, this intake air processing portion includes the intake air flow quantity controlling unit 24 and the actual cylinder intake air flow quantity calculating unit 21. A time constant τ1 set in the actual cylinder intake air flow quantity calculating unit 21 is a value used in the response delay model for the intake system expressed by the aforementioned equation (3).

In the case where the target cylinder intake air amount Qct is directly used as the target engine intake air amount Qat, the actual engine intake air amount Qar, which is controlled by the intake air flow quantity controlling unit 24 based on the target engine intake air amount Qat, satisfies a relationship expressed by the following equation (5).

$$Qct=Qat\approx Qar \quad (5)$$

Figure 5:
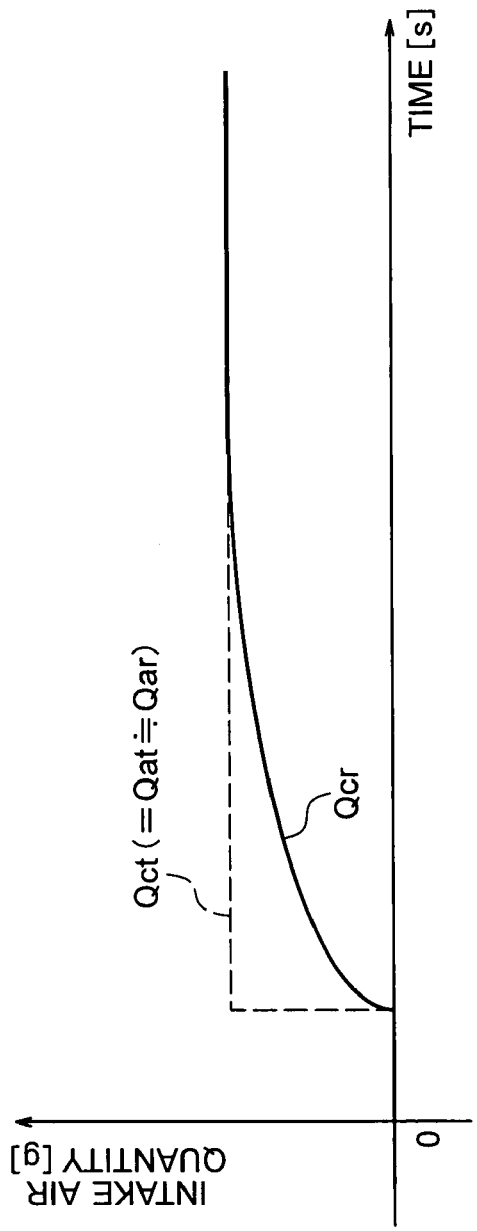
FIG. 5 is an explanatory diagram showing response characteristics of the intake air processing portion shown in FIG. 4.

The actual cylinder intake air amount Qcr, which is calculated by the actual cylinder intake air flow quantity calculating unit 21 based on the actual engine intake air amount Qar, is a first-order lag system as indicated by the response delay model for the intake system in the aforementioned equation (3). Response characteristics as shown in FIG. 5 are obtained in the intake air processing portion from the target engine intake air amount Qat to the actual cylinder intake air amount Qcr.

In other words, the actual cylinder intake air amount Qcr cannot be manipulated with respect to the target cylinder intake air amount Qct in the intake air processing portion, so a delay in the intake system has a direct influence thereon.

Therefore, the concept of making a correction equivalent to phase lead compensation for the target cylinder intake air amount Qct to calculate the target engine intake air amount Qat so that the intake air flow quantity controlling unit 24 controls the throttle opening degree TP based on the target engine intake air amount Qat is taken into account.

Figure 6:
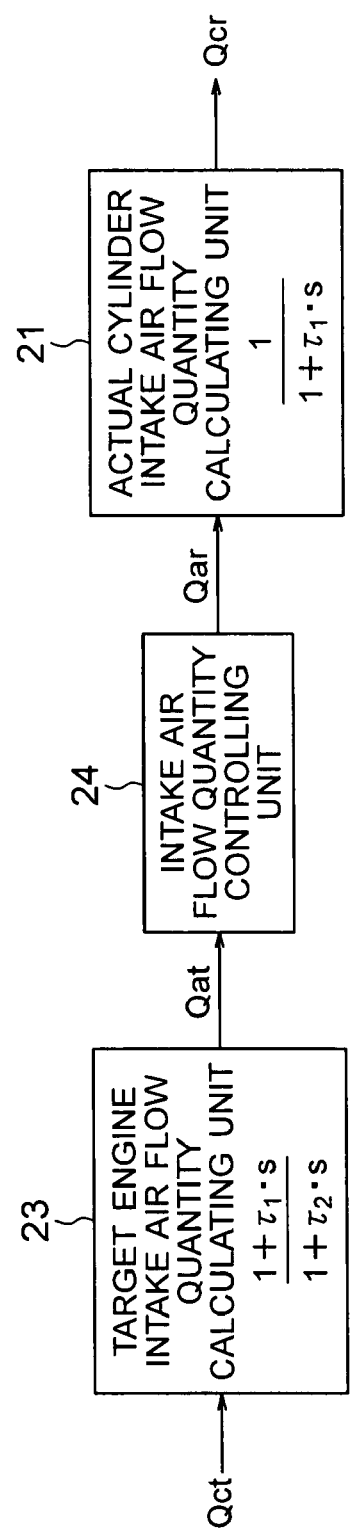
FIG. 6 is a block diagram showing an intake air processing portion from the target cylinder intake air amount to the actual cylinder intake air amount according to the first embodiment of the present invention.

FIG. 6 is a block diagram showing an intake air processing portion from the target cylinder intake air amount Qct to the actual cylinder intake air amount Qcr according to the first embodiment of the present invention.

Referring to FIG. 6, this intake air processing portion includes the target engine intake air flow quantity calculating unit 23, the intake air flow quantity controlling unit 24, and the actual cylinder intake air flow quantity calculating unit 21.

As described above, the target engine intake air flow quantity calculating unit 23 makes the correction equivalent to phase lead compensation for the target cylinder intake air amount Qct calculated by the target cylinder intake air flow quantity calculating unit 22 to calculate the target engine intake air amount Qat.

The time constant τ1 of the response delay model for the intake system is used as a time constant of a first-order lead element corresponding to a numerator of phase lead compensation made by the target engine intake air flow quantity calculating unit 23, and a time constant τ2 smaller than the time constant τ1 is used as a time constant of a first-order lag element corresponding to a denominator of phase lead compensation, so phase lead compensation can be realized.

When this is taken into account in respect of the entire intake air processing portion shown in FIG. 6, the first-order lead element of the target engine intake air flow quantity calculating unit 23 and the first-order lag element of the actual cylinder intake air flow quantity calculating unit 21 can be reduced on the assumption that the response delay of the throttle valve 6, the response delay of the air flow sensor 4, and the like are negligible.

It is thus apparent that the response characteristics of the intake air processing portion coincide with the response characteristics of the first-order lag element corresponding to the denominator of phase lead compensation made by the target engine intake air flow quantity calculating unit 23.

To mount the target engine intake air flow quantity calculating unit 23 on the actual ECU 12, the aforementioned phase lead compensation needs to be divided into the first-order lag element and the first-order lead element.

Figure 7:
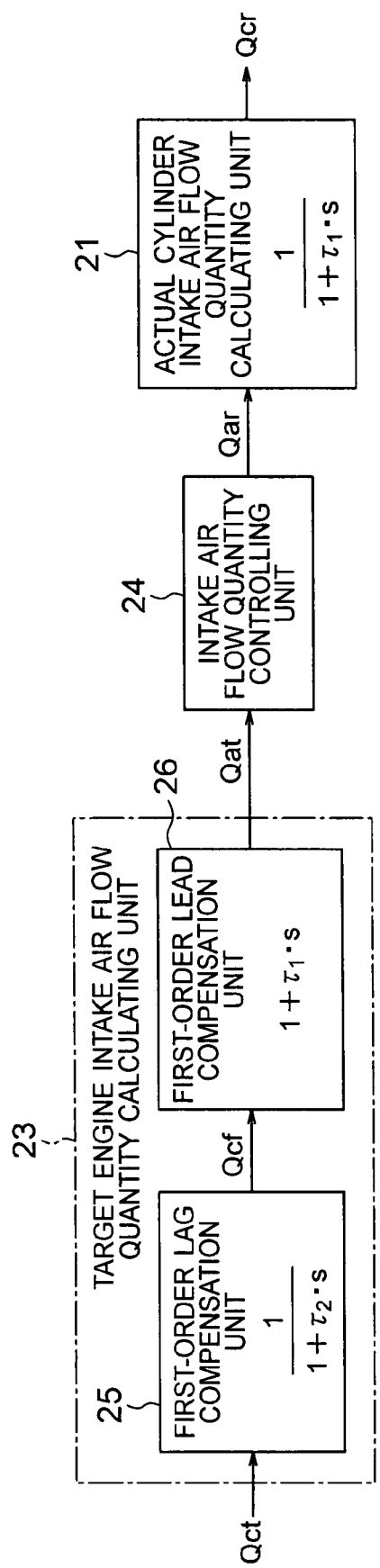
FIG. 7 is a block diagram showing another intake air processing portion from the target cylinder intake air amount to the actual cylinder intake air amount according to the first embodiment of the present invention.

FIG. 7 is a block diagram showing another intake air processing portion from the target cylinder intake air amount Qct to the actual cylinder intake air amount Qcr according to the first embodiment of the present invention.

Referring to FIG. 7, this intake air processing portion includes the target engine intake air flow quantity calculating unit 23, the intake air flow quantity controlling unit 24, and the actual cylinder intake air flow quantity calculating unit 21. The target engine intake air flow quantity calculating unit 23 includes a first-order lag compensation unit 25 and a first-order lead compensation unit 26.

The first-order lag compensation unit 25 makes compensation equivalent to the aforementioned first-order lag element (hereinafter referred to as "target first-order lag compensation") for the target cylinder intake air amount Qct to calculate a target cylinder intake air amount Qcf (target cylinder intake air flow quantity compensated for by first-order lag compensation unit) (hereinafter abbreviated as "the post-compensation target cylinder intake air amount Qcf") after target first-order lag compensation.

The first-order lead compensation unit 26 makes compensation equivalent to the aforementioned first-order lead element (hereinafter referred to as "intake system-equivalent first-order lead compensation") for the post-compensation target cylinder intake air amount Qcf to calculate the target engine intake air amount Qat.

The intake air flow quantity controlling unit 24 controls the throttle opening degree TP based on the target engine intake air amount Qat calculated by the first-order lead compensation unit 26, so the actual engine intake air amount Qar is obtained. The actual cylinder intake air flow quantity calculating unit 21 calculates the actual cylinder intake air amount Qcr based on the actual engine intake air amount Qar and the response delay model for the intake system in the aforementioned equation (3).

Figure 8:
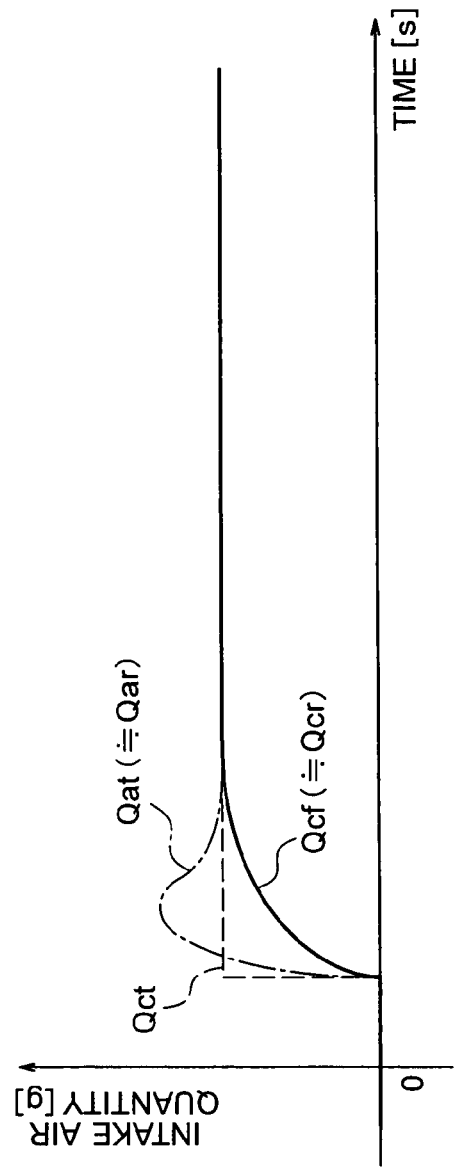
FIG. 8 is an explanatory diagram showing response characteristics of the intake air processing portion shown in FIG. 7.

Response characteristics as shown in FIG. 8 are obtained in the intake air processing portion shown in FIG. 7.

Referring to FIG. 8, it is apparent that the target engine intake air amount Qat and the actual engine intake air amount Qar substantially coincide with each other, and that the post-compensation target cylinder intake air amount Qcf and the actual cylinder intake air amount Qcr substantially coincide with each other as well.

As described above, the time constant τ2 smaller than the time constant τ1 is used as a time constant of target first-order lag compensation made by the first-order lag compensation unit 25, and the time constant τ1 of the response delay model for the intake system is used as a time constant of intake system-equivalent first-order lead compensation made by the first-order lead compensation unit 26, so phase lead compensation can be realized. As a result, the response characteristics of the intake air processing portion can be manipulated.

Next, it will be described in detail with reference to FIG. 7 how the first-order lag compensation unit 25 makes target first-order lag compensation for the target cylinder intake air amount Qct to calculate the post-compensation target cylinder intake air amount Qcf.

First of all, the post-compensation target cylinder intake air amount Qcf is expressed by the following equation (6) through a calculation similar to that of the aforementioned equation (3).

It should be noted in the equation (6) that Qcf(n) [g/s] denotes an average value per stroke of the post-compensation target cylinder intake air amount Qcf, and that Qct(n) [g/s] denotes an average value per stroke of the target cylinder intake air amount Qct.

$$Qcf(n)T(n) = \qquad (6)$$
$$\frac{Kv(n)}{Kv(n-1)} \cdot Kf2 \cdot Qcf(n-1)T(n-1) + (1-Kf2) \cdot Qct(n)T(n)$$

$$\because Kf2 = \frac{Vs1}{Vs1 + Kv(n) \cdot Vc}$$

In the equation (6), a relationship: Kv(n)/Kv(n−1)=1 may be acknowledged on the assumption that the volumetric efficiency correction coefficient Kv(n) and the volumetric efficiency correction coefficient Kv(n−1) are substantially equal to each other.

The time constant τ2 of target first-order lag compensation is smaller than the time constant τ1 of the response delay model for the intake system, so a filter constant Kf2 calculated from the time constant τ2 of target first-order lag compensation is smaller than the filter constant Kf calculated from the time constant τ1 of the response delay model for the intake system.

In this case, the filter constant Kf2 may be calculated using a simulated intake pipe volume Vs1 smaller than the intake pipe volume Vs as indicated by a calculation formula in the aforementioned equation (6) instead of using the intake pipe volume Vs shown in the calculation formula in the aforementioned equation (3). Alternatively, a predetermined value smaller than the filter constant Kf, which is calculated from the calculation formula in the aforementioned equation (3), may be used as a target filter constant.

To invalidate target first-order lag compensation, it is appropriate to cause the time constant τ2 of target first-order lag compensation made by the first-order lag compensation unit 25 and the time constant τ1 of intake system-equivalent first-order lead compensation made by the first-order lead compensation unit 26 to coincide with each other.

It is also appropriate to make a switchover between validation and invalidation of target first-order lag compensation or to change the time constant τ2 of target first-order lag compensation or the simulated intake pipe volume Vs1 based on, for example, operating conditions during idling operation and other types of operation and operating conditions such as operation ranges divided according to the rotational speed Ne of the engine 1 and the filling efficiency thereof.

Thus, the optimum response characteristics during transitional response can be obtained for each of the operating conditions.

Subsequently, it will be described in detail with reference to FIG. 7 how the first-order lead compensation unit 26 performs the processing of making intake system-equivalent first-order lead compensation for the post-compensation target cylinder intake air amount Qcf to calculate the target engine intake air amount Qat.

First of all, the target engine intake air amount Qat is expressed by the following equation (7) through back calculation of an arithmetical operation similar to that of the aforementioned equation (3).

It should be noted in the equation (7) that Qat(n) [g/s] denotes an average value per stroke of the target engine intake air amount Qat.

$$Qcf(n)T(n) = \qquad (7)$$
$$\frac{Kv(n)}{Kv(n-1)} \cdot Kf1 \cdot Qcf(n-1)T(n-1) + (1-Kf1) \cdot Qat(n)T(n)$$

$$\therefore Qat(n)T(n) = \frac{Qcf(n)T(n) - \frac{Kv(n)}{Kv(n-1)} \cdot Kf1 \cdot Qcf(n-1)T(n-1)}{1 - Kf1}$$

$$\because Kf1 = \frac{Vs}{Vs + Kv(n) \cdot Vc}$$

In the equation (7), a relationship: Kv(n)/Kv(n−1)=1 may be acknowledged on the assumption that Kv(n) and Kv(n−1) are substantially equal to each other.

The time constant τ1 of intake system-equivalent first-order lead compensation is equal to the time constant τ1 of the response delay model for the intake system, so the filter constant Kf1 calculated from the time constant τ1 of intake system-equivalent first-order lead compensation is equal to the filter constant Kf calculated from the time constant τ1 of the response delay model for the intake system.

Accordingly, phase lead compensation for the target cylinder intake air amount Qct can be realized through calculation of the post-compensation target cylinder intake air amount Qcf and the target engine intake air amount Qat with the use of the aforementioned equations (6) and (7).

In the control device for the internal combustion engine according to the first embodiment of the present invention, the first-order lag compensation unit 25 of the target engine intake air flow quantity calculating unit 23 makes target first-order lag compensation for the target cylinder intake air amount Qct to calculate the post-compensation target cylinder intake air amount Qcf. The first-order lead compensation unit 26 of the target engine intake air flow quantity calculating unit 23 makes intake system-equivalent first-order lead compensation for the post-compensation target cylinder intake air amount Qcf to calculate the target engine intake air amount Qat.

It is therefore possible to calculate with high accuracy the target engine intake air amount Qat in the vicinity of the throttle valve 6 with a reduced number of man-hours and in a shorter calculation time such that the actual cylinder intake air amount Qcr swiftly converges at the target cylinder intake air amount Qct even during transitional operation, using the simple operational expressions derived from the physical model for the intake system, and to control the throttle opening degree TP in accordance with the target engine intake air amount Qat.

Second Embodiment

Figure 9:
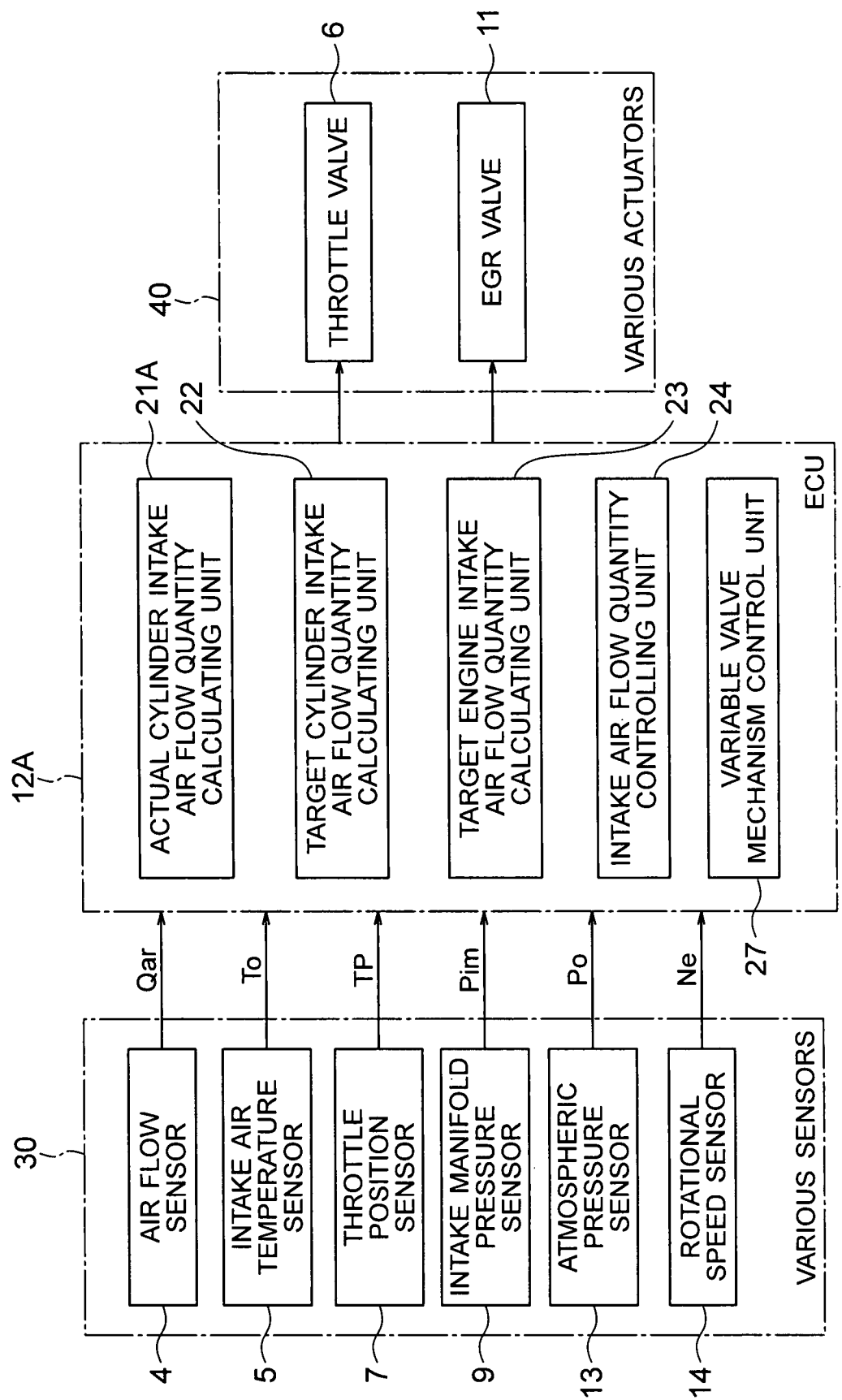
FIG. 9 is a block diagram roughly showing the construction of an engine control portion of a control device for an internal combustion engine according to a second embodiment of the present invention.

FIG. 9 is a block diagram roughly showing the construction of an engine control portion of a control device for an internal combustion engine according to the second embodiment of the present invention.

Referring to FIG. 9, an ECU 12A further includes a variable valve mechanism control unit 27 for variably controlling an actuation state of at least either intake valves (not shown) or exhaust valves (not shown) of the engine 1. The ECU 12A includes an actual cylinder intake air flow quantity calculating unit 21A instead of the actual cylinder intake air flow quantity calculating unit 21 shown in FIG. 2.

It should be noted herein that a relationship between the rotational speed Ne and the intake manifold pressure Pim on the one hand and the volumetric efficiency correction coefficient Kv on the other is measured in the engine 1 in advance for each of actuation states such as lift and phase angle of the intake valves or the exhaust valves, and stored in the memory as a map.

The second embodiment of the present invention is identical to the first embodiment of the present invention in other configurational details, so the description thereof will be omitted.

The operation of the actual cylinder intake air flow quantity calculating unit 21A according to the second embodiment of the present invention will be described hereinafter with reference to FIG. 9.

The operational details identical to those of the first embodiment of the present invention will not be described below.

First of all, the actual cylinder intake air flow quantity calculating unit 21A maps each map using the rotational speed Ne and the intake manifold pressure Pim.

Then, the actual cylinder intake air flow quantity calculating unit 21A interpolates mapped values based on the latest actuation state of the intake valves or the exhaust valves to calculate the volumetric efficiency correction coefficient Kv.

In the control device for the internal combustion engine according to the second embodiment of the present invention, the actual cylinder intake air flow quantity calculating unit 21A interpolates the values mapped from the rotational speed Ne and the intake manifold pressure Pim based on the latest actuation state of the intake valves or the exhaust valves, thereby calculating the volumetric efficiency correction coefficient Kv.

It is therefore possible to calculate with high accuracy the actual cylinder intake air amount Qcr through simple operations even in the case of the engine 1 having the variable valve mechanism control unit 27 for variably controlling the actuation state of at least either the intake valves or the exhaust valves.

In the foregoing second embodiment of the present invention, the relationship between the rotational speed Ne and the intake manifold pressure Pim on the one hand and the volumetric efficiency correction coefficient Kv on the other is stored in the memory in advance as a map for each of the actuation states such as lift amount and phase angle of the intake valves or the exhaust valves. However, the present invention is not limited thereto.

As a simpler method, it is also appropriate that a relationship between the rotational speed Ne and the intake manifold pressure Pim on the one hand and the volumetric efficiency correction coefficient Kv on the other be stored in the memory in advance as a map as to each of two patterns, namely, a pattern during an actuated state of the intake valves or the exhaust valves and a pattern during a non-actuated state thereof, and that the actual cylinder intake air flow quantity calculating unit 21A calculate the volumetric efficiency correction coefficient Kv using a map for actuation during the actuated state of the intake valves or the exhaust valves and a map for non-actuation during the non-actuated state thereof.

In this case as well, an effect similar to that of the foregoing second embodiment of the present invention can be achieved.

Further, it is also appropriate that a volumetric efficiency correction coefficient serving as a reference during an actuated state of the intake valves or the exhaust valves be stored in the memory as a reference volumetric efficiency, that a correction amount corresponding to a deviation from the reference volumetric efficiency be stored in the memory as a map, and that the actual cylinder intake air flow quantity calculating unit 21A map the correction amount based on the latest actuated state of the intake valves or the exhaust valves and correct the reference volumetric efficiency to calculate the volumetric efficiency correction coefficient Kv.

In this case as well, an effect similar to that of the foregoing second embodiment of the present invention can be achieved.

Third Embodiment

In a case where an actual engine control system is taken into account, although not mentioned in the foregoing first embodiment of the present invention, a predetermined dead time and a predetermined response delay may occur until the actual engine intake air amount Qar measured by the air flow sensor 4 is input to the ECU 12 after the target engine intake air flow quantity calculating unit 23 calculates the target engine intake air amount Qat.

In this case, the following respective procedures are carried out until the actual engine intake air amount Qar is input after the target engine intake air amount Qat is calculated. That is, the intake air flow quantity controlling unit 24 controls the throttle opening degree TP based on the target engine intake air amount Qat, air in the vicinity of the throttle valve 6 responds thereto to exert an influence on air in the vicinity of the air flow sensor 4, and the air flow sensor 4 measures the actual engine intake air amount Qar.

That is, although the target engine intake air amount Qat and the actual engine intake air amount Qar substantially coincide with each other and the post-compensation target cylinder intake air amount Qcf and the actual cylinder intake air amount Qcr substantially coincide with each other as well according to the foregoing description with reference to FIG. 8, a certain dead time and a certain response delay are actually observed between the target engine intake air amount Qat and the actual engine intake air amount Qar.

In the case of performing control without regard to the dead time or the response delay, the effect resulting from phase lead compensation as described in the first embodiment of the present invention may not be achieved sufficiently.

If the dead time and the response delay can be physically modeled to be calculated in the ECU 12, their influences can be eliminated.

However, the dead time and the response delay are considered to change depending on the operating conditions or the like and also on individual differences and the like in the throttle valve 6, which is electronically controlled in an opening/closing manner, and the air flow sensor 4. In reality, therefore, the concept of physically modeling the dead time and the response delay is considered to be difficult.

Thus, the concept of structuring a feedback system simply through a calculation for causing the post-compensation target cylinder intake air amount Qcf and the actual cylinder intake air amount Qcr to coincide with each other so as to reduce the influences of the dead time and the response delay is conceived.

Figure 10:
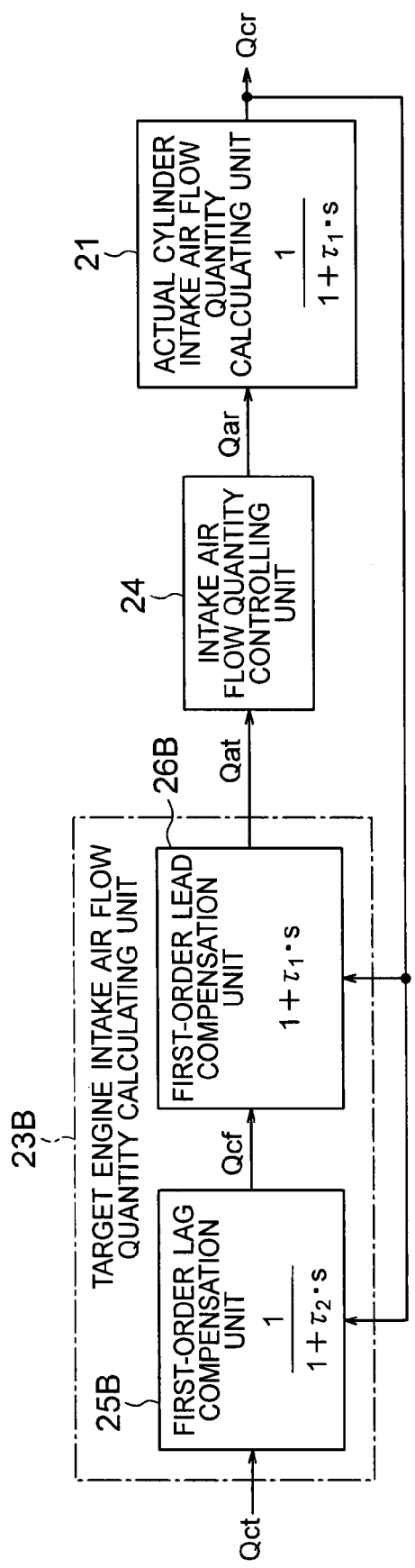
FIG. 10 is a block diagram showing an intake air processing portion from a target cylinder intake air amount to an actual cylinder intake air amount according to a third embodiment of the present invention.

FIG. 10 is a block diagram showing an intake air processing portion from the target cylinder intake air amount Qct to the actual cylinder intake air amount Qcr according to the third embodiment of the present invention.

Referring to FIG. 10, this intake air processing portion includes a target engine intake air flow quantity calculating unit 23B, the intake air flow quantity controlling unit 24, and the actual cylinder intake air flow quantity calculating unit 21. The target engine intake air flow quantity calculating unit 23B includes a first-order lag compensation unit 25B and a first-order lead compensation unit 26B. The actual cylinder intake air amount Qcr output from the actual cylinder intake air flow quantity calculating unit 21 is input to the first-order lag compensation unit 25B and the first-order lead compensation unit 26B.

The first-order lag compensation unit 25B makes target first-order lag compensation for the target cylinder intake air amount Qct using the actual cylinder intake air amount Qcr output from the actual cylinder intake air flow quantity calculating unit 21, thereby calculating the post-compensation target cylinder intake air amount Qcf.

The first-order lead compensation unit 26B makes intake system-equivalent first-order lead compensation for the post-correction target cylinder intake air amount Qcf using the actual cylinder intake air amount Qcr output from the actual cylinder intake air flow quantity calculating unit 21, thereby calculating the target engine intake air amount Qat.

The third embodiment of the present invention is identical to the foregoing first embodiment of the present invention in other configurational details, so the description thereof will be omitted.

Next, it will be described in detail with reference to FIG. 10 how the first-order lag compensation unit 25B makes target first-order lag compensation for the target cylinder intake air amount Qct using the actual cylinder intake air amount Qcr to calculate the post-compensation target cylinder intake air amount Qcf.

The operational details identical to those of the first embodiment of the present invention will not be described below.

First of all, the post-compensation target cylinder intake air amount Qcf is expressed by the following equation (8) by using the actual cylinder intake air amount Qcr(n)T(n) per stroke and the volumetric efficiency correction coefficient Kv(n) in the latest stroke (current stroke n) in the aforementioned equation (6) instead of using the post-compensation target cylinder intake air amount Qcf(n−1)T(n−1) and the volumetric efficiency correction coefficient Kv(n−1) in the preceding stroke (stroke n−1).

$$Qcf(n) = Kf2 \cdot Qcr(n) + (1 - Kf2) \cdot Qct(n) \quad (8)$$
$$\because Kf2 = \frac{Vs1}{Vs1 + Kv(n) \cdot Vc}$$

The time constant τ2 of target first-order lag compensation is smaller than the time constant τ1 of the response delay model for the intake system, so the filter constant Kf2 calculated from the time constant τ2 of target first-order lag compensation is smaller than the filter constant Kf calculated from the time constant τ1 of the response delay model for the intake system.

In this case, the filter constant Kf2 may be calculated using the simulated intake pipe volume Vs1 smaller than the intake pipe volume Vs as indicated by a calculation formula in the aforementioned equation (8) instead of using the intake pipe volume Vs shown in the calculation formula in the aforementioned equation (3). Alternatively, a predetermined value smaller than the filter constant Kf, which is calculated from the calculation formula in the aforementioned equation (3), may be used as a target filter constant.

To invalidate target first-order lag compensation, it is appropriate to cause the time constant τ2 of target first-order lag compensation made by the first-order lag compensation unit 25B and the time constant τ1 of intake system-equivalent first-order lead compensation made by the first-order lead compensation unit 26B to coincide with each other.

It is also appropriate to make a switchover between validation and invalidation of target first-order lag compensation or to change the time constant τ2 of target first-order lag compensation or the simulated intake pipe volume Vs1 based on, for example, operating conditions during idling operation and other types of operation and operating conditions such as operation ranges divided according to the rotational speed Ne of the engine 1 and the filling efficiency thereof.

Thus, the optimum response characteristics during transitional response can be obtained for each of the operating conditions.

Subsequently, it will be described in detail with reference to FIG. 10 how the first-order lead compensation unit 26B performs the processing of making intake system-equivalent first-order lead compensation for the post-compensation target cylinder intake air amount Qcf using the actual cylinder intake air amount Qcr to calculate the target engine intake air amount Qat.

First of all, the target engine intake air amount Qat is expressed by the following equation (9) through transformation of the aforementioned equation (7) in a manner similar to that of the aforementioned equation (8).

$$Qat(n) = \frac{Qcf(n) - Kf1 \cdot Qcr(n)}{1 - Kf1} \quad (9)$$
$$\because Kf1 = \frac{Vs}{Vs + Kv(n) \cdot Vc}$$

The time constant τ1 of intake system-equivalent first-order lead compensation is equal to the time constant τ1 of the response delay model for the intake system, so the filter constant Kf1 calculated from the time constant τ1 of intake system-equivalent first-order lead compensation is equal to the filter constant Kf calculated from the time constant τ1 of the response delay model for the intake system.

Figure 11:
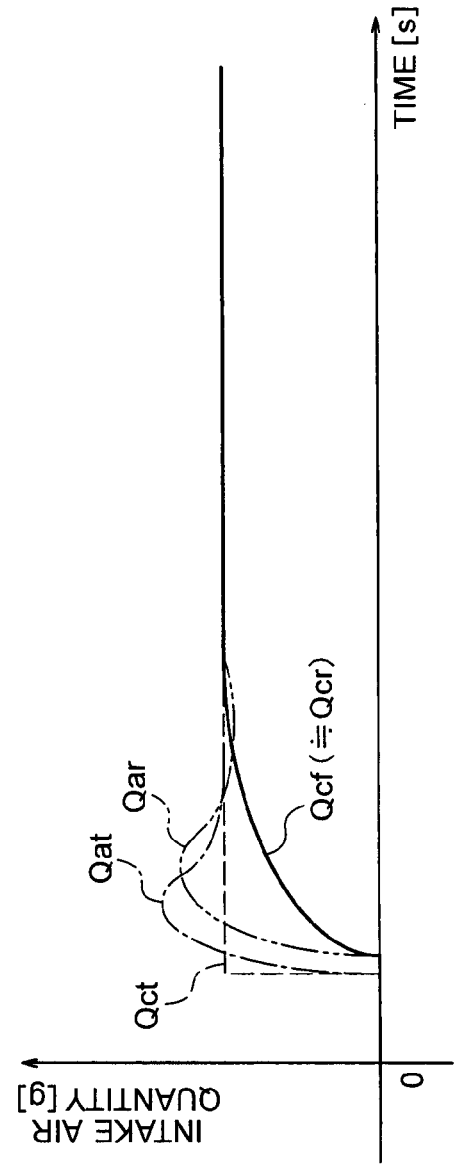
FIG. 11 is an explanatory diagram showing response characteristics of the intake air processing portion shown in FIG. 10.

Response characteristics as shown in FIG. 11 are obtained in the intake air processing portion shown in FIG. 10.

Referring to FIG. 11, it is apparent that although the target engine intake air amount Qat and the actual engine intake air amount Qar do not coincide with each other due to the influences of the dead time and the response delay as mentioned above, the post-compensation target cylinder intake air amount Qcf and the actual cylinder intake air amount Qcr substantially coincide with each other.

The following equation (10) is obtained through substitution of Kf2·Qcr(n)+(1−Kf2)·Qct(n) in the equation (8) for Qcf(n) in the equation (9). The equation (10) indicates proportional control. It is apparent from the equation (10) that the target engine intake air amount Qat is calculated so as to make the target cylinder intake air amount Qct and the actual cylinder intake air amount Qcr coincident with each other.

$$Qat(n) = Qct(n) + Kp \cdot \{Qct(n) - Qcr(n)\} \quad (10)$$
$$\because Kp = -\frac{Kf2 - Kf1}{1 - Kf1}$$

As described above, even when a certain dead time and a certain response delay exist between the target engine intake air amount Qat and the actual engine intake air amount Qar, it is possible to realize phase lead compensation and manipulate the response characteristics of the intake air processing portion through the use of the time constant τ2 smaller than the time constant τ1 as the time constant of target first-order lag compensation made by the first-order lag compensation unit 25B and the use of the time constant τ1 of the response delay model for the intake system as the time constant of intake system-equivalent first-order lead compensation made by the first-order lead compensation unit 26B.

It is therefore possible to perform control such that the actual cylinder intake air amount Qcr output from the actual cylinder intake air flow quantity calculating unit 21 and the post-compensation target cylinder intake air amount Qcf substantially coincide with each other even when a certain dead time and a certain response delay exist between the target engine intake air amount Qat and the actual engine intake air amount Qar, through calculation of the post-compensation target cylinder intake air amount Qcf and the target engine intake air amount Qat with the use of the aforementioned equations (8) and (9).

In the control device for the internal combustion engine according to the third embodiment of the present invention, the first-order lag compensation unit 25B makes target first-order lag compensation for the target cylinder intake air amount Qct using the latest actual cylinder intake air amount Qcr, thereby calculating the post-compensation target cylinder intake air amount Qcf. The first-order lead compensation unit 26B makes intake system-equivalent first-order lead compensation for the post-compensation target cylinder intake air amount Qcf using the latest actual cylinder intake air amount Qcr, thereby calculating the target engine intake air amount Qat.

It is therefore possible to calculate with higher accuracy the target engine intake air amount Qat in the vicinity of the throttle valve 6 with a reduced number of man-hours and in a shorter calculation time such that the actual cylinder intake air amount Qcr swiftly converges at the target cylinder intake air amount Qct even during transitional operation, using the simple operational expressions derived from the physical model for the intake system, and to control the throttle opening degree TP in accordance with the target engine intake air amount Qat.

What is claimed is:

1. A control device for an internal combustion engine, comprising:
    a throttle valve provided in an intake pipe of the internal combustion engine;
    intake air flow quantity controlling means for controlling a throttle opening degree of the throttle valve to change an opening area of the intake pipe and hence variably controlling an actual engine intake air flow quantity, namely, a flow quantity of air actually sucked by the internal combustion engine;
    operation state detecting means for detecting operation states including at least a rotational speed of the internal combustion engine;
    intake air flow quantity detecting means provided upstream of the throttle valve in the intake pipe, for detecting the actual engine intake air flow quantity, namely, the flow quantity of air actually sucked by the internal combustion engine;
    intake pipe internal pressure detecting means for detecting a pressure downstream of the throttle valve in the intake pipe as an intake pipe internal pressure;
    actual cylinder intake air flow quantity calculating means for calculating an actual cylinder intake air flow quantity, namely, a flow quantity of air actually sucked into cylinders of the internal combustion engine;
    target cylinder intake air flow quantity calculating means for calculating a target cylinder intake air flow quantity based on the operation states; and
    target engine intake air flow quantity calculating means for making a correction equivalent to phase lead compensation for the target cylinder intake air flow quantity to calculate a target engine intake air flow quantity, wherein
    the actual cylinder intake air flow quantity calculating means calculates:
        a volumetric efficiency equivalent value of air sucked into the cylinders from the intake pipe based on the rotational speed and the intake pipe internal pressure;
        a response delay model for an intake system based on the volumetric efficiency equivalent value, an intake pipe volume from a downstream side of the throttle valve to inlets of the cylinders, and a displacement of each of the cylinders; and
        the actual cylinder intake air flow quantity based on the actual engine intake air flow quantity and the response delay model; and
    the intake air flow quantity controlling means controls the throttle opening degree based on the target engine intake air flow quantity such that the actual cylinder intake air flow quantity converges at the target cylinder intake air flow quantity.

2. A control device for an internal combustion engine according to claim 1, further comprising variable valve mechanism control means for variably controlling an actuation state of at least one of intake valves and exhaust valves of the internal combustion engine, wherein
    the actual cylinder intake air flow quantity calculating means calculates the volumetric efficiency equivalent value of air sucked into the cylinders from the intake pipe based on the actuation state of one of the intake valves and the exhaust valves.

3. A control device for an internal combustion engine according to claim 1, wherein:
    the target engine intake air flow quantity calculating means includes first-order lag compensation means for making compensation equivalent to a first-order lag element for the target cylinder intake air flow quantity, and first-order lead compensation means for making compensation equivalent to a first-order lead element for the target cylinder intake air flow quantity compensated for by the first-order lag compensation means;
    the first-order lag compensation means has set therein a time constant smaller than a time constant of the response delay model; and
    the first-order lead compensation means has set therein a time constant equal to the time constant of the response delay model.

4. A control device for an internal combustion engine according to claim 3, wherein:
    the first-order lag compensation means calculates a simulated response delay model based on the volumetric efficiency equivalent value, a simulated intake pipe volume smaller than the intake pipe volume, and the displacement, and makes compensation equivalent to the first-order lag element using the simulated response delay model; and
    the first-order lead compensation means makes compensation equivalent to the first-order lead element using an inverse model of the response delay model.

5. A control device for an internal combustion engine according to claim 4, wherein the first-order lag compensation means and the first-order lead compensation means make compensation equivalent to the first-order lag element and compensation equivalent to the first-order lead element, respectively, at intervals of a predetermined crank angle of a crankshaft of the internal combustion engine, using a target cylinder intake air flow quantity compensated for by the first-order lag compensation means in a preceding stroke in the simulated response delay model and the inverse model, respectively.

6. A control device for an internal combustion engine according to claim 4, wherein the first-order lag compensation means and the first-order lead compensation means make compensation equivalent to the first-order lag element and compensation equivalent to the first-order lead element, respectively, at intervals of a predetermined crank angle of a crankshaft of the internal combustion engine, using an actual cylinder intake air flow quantity in a current stroke in the simulated response delay model and the inverse model, respectively.

7. A control device for an internal combustion engine according to claim 3, wherein the first-order lag compensation means sets the time constant in accordance with an operating condition of the internal combustion engine.

8. A control device for an internal combustion engine according to claim 4, wherein the first-order lag compensation means sets the simulated intake pipe volume in accordance with an operating condition of the internal combustion engine.

* * * * *